(12) United States Patent
Anderson et al.

(10) Patent No.: US 6,550,279 B1
(45) Date of Patent: Apr. 22, 2003

(54) PROCESS FOR DRAWING OPTICAL FIBER FROM A MULTIPLE CRUCIBLE APPARATUS WITH A THERMAL GRADIENT

(75) Inventors: James G. Anderson, Dundee, NY (US); Ernest E. Brand, Corning, NY (US); Adam J. Ellison, Corning, NY (US); Jackson P. Trentelman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 197 days.

(21) Appl. No.: 09/654,549

(22) Filed: Sep. 1, 2000

(51) Int. Cl.⁷ .......................................... C03B 37/027
(52) U.S. Cl. ................. 65/377; 65/384; 65/405; 65/488; 65/502; 65/379
(58) Field of Search .................. 65/384, 405, 488, 65/502, 379, 377

(56) References Cited

U.S. PATENT DOCUMENTS

| | | | |
|---|---|---|---|
| 3,957,342 A | 5/1976 | Newns et al. ................ | 350/96 |
| 3,999,835 A | 12/1976 | Newns et al. ................ | 350/96 |
| 4,023,952 A | 5/1977 | Newns et al .................. | 65/32 |
| 4,101,305 A | 7/1978 | Midwinter et al. ........... | 65/145 |
| 4,118,212 A | 10/1978 | Aulich et al. .................. | 65/3 |
| 4,125,200 A | 11/1978 | Manely ...................... | 215/246 |
| 4,145,200 A | 3/1979 | Yamazaki et al. ............. | 65/2 |
| 4,217,123 A | 8/1980 | Titchmarsh .................... | 65/3 |
| 4,259,101 A | 3/1981 | Aulich .......................... | 65/11 |
| 4,275,951 A | 6/1981 | Beales et al. ............ | 350/96.31 |
| 4,277,270 A | 7/1981 | Krohn ............................ | 65/3 |
| 4,289,516 A | 9/1981 | Krohn ............................ | 65/3 |
| 4,308,045 A | 12/1981 | Miller ......................... | 65/3.11 |
| 4,326,869 A | 4/1982 | Kurosaki et al. ............ | 65/3.14 |
| 4,351,659 A | 9/1982 | Beales et al. ............... | 65/3.13 |
| 4,372,645 A | 2/1983 | Miller ....................... | 350/96.3 |

(List continued on next page.)

FOREIGN PATENT DOCUMENTS

| | | | |
|---|---|---|---|
| CA | 1156467 | 11/1983 | |
| EP | 0 082 517 A1 | 6/1983 | ........... C03B/37/02 |
| GB | 1448080 | 9/1976 | |
| GB | 2 148 874 A | 6/1985 | ......... C03B/37/025 |
| WO | 99/51537 | 10/1999 | |

OTHER PUBLICATIONS

Abstract of JP 06 051138 A, Nippon Telegraph & Telephone Corp., dated Feb. 25, 1994.

A. Kerdoncuff, "Flow Control For Optical Fiber Fabrication Using the Double Crucible Technique", U.S. Ser. No. 09/325,298, filed Jul. 3, 1998, Figs. 1–7, pp. 1–17.

*Primary Examiner*—John Hoffmann
(74) *Attorney, Agent, or Firm*—Timothy R. Krogh (57) ABSTRACT

The disclosed invention includes a method of making an optical fiber drawn from a multiple crucible. The method includes moving a first crucible of the multiple crucible relative to a second crucible of the multiple crucible. The invention also includes minimizing core and cladding diffusion. A tip of the first crucible is disposed axially above a tip of the second crucible by a preselected distance. The invention further includes the ability to alter a diameter of the core of the fiber. A differential pressure is applied to the first crucible. A positive differential pressure is applied to increase the core diameter. A negative differential pressure is applied to decrease the core diameter. Furthermore, the invention includes drawing the fiber under non-isothermal conditions; there is a thermal gradient of at least 10° C./m between the two tips.

20 Claims, 6 Drawing Sheets

U.S. PATENT DOCUMENTS

| | | |
|---|---|---|
| 4,372,767 A | 2/1983 | Maklad .................... 65/3.12 |
| 4,385,916 A | 5/1983 | Jochem et al. ............. 65/3.13 |
| 4,407,667 A | 10/1983 | LeNoane et al. ........... 65/3.11 |
| 4,410,345 A * | 10/1983 | Usui et al. .................. 65/399 |
| 4,452,508 A | 6/1984 | Beales et al. ............ 350/96.31 |
| 4,466,818 A | 8/1984 | Brongersma ............... 65/3.13 |
| 4,729,777 A | 3/1988 | Mimura et al. ............. 65/3.13 |
| 4,768,859 A | 9/1988 | Kasori et al. ............ 350/96.34 |
| 4,897,100 A | 1/1990 | Nice ......................... 65/3.13 |
| 4,911,895 A | 3/1990 | Kida et al. ................. 422/245 |
| 4,950,047 A | 8/1990 | Berkey et al. ........... 350/96.23 |
| 5,069,741 A | 12/1991 | Kida et al. ............... 156/617.1 |
| 5,081,076 A | 1/1992 | Rapp ......................... 501/40 |
| 5,100,449 A | 3/1992 | Cornelius et al. ............... 65/2 |
| 5,106,400 A | 4/1992 | Tick .......................... 65/3.11 |
| 5,149,349 A | 9/1992 | Berkey et al. ............. 65/3.11 |
| 5,161,050 A | 11/1992 | Grasso et al. ............. 359/341 |
| 5,364,432 A * | 11/1994 | Leber ......................... 65/17.3 |
| 5,609,665 A | 3/1997 | Bruce et al. ................ 65/379 |
| 5,776,223 A | 7/1998 | Huang ........................ 65/437 |
| 5,879,426 A | 3/1999 | Sanghera et al. ........... 65/405 |

* cited by examiner

PROCESS FOR DRAWING OPTICAL FIBER FROM A MULTIPLE CRUCIBLE APPARATUS WITH A THERMAL GRADIENT

BACKGROUND OF THE INVENTION

1. Field of the Invention

The present invention relates generally to optical fiber (hereinafter "fiber") and more particularly to a multiple crucible method of making fiber.

2. Technical Background

The most widely known multiple crucible method of drawing fiber is the double crucible method. The double crucible method of making fiber has been known for at least the last two or three decades, and is disclosed for example in *Optical Fibers for Transmission,* New York John Wiley, pp. 166–178 (Midwinter, 1979).

Much of the early work in the area of drawing multimode fiber by double crucible exploited the natural tendency of the fiber core and cladding to diffuse (mix). This type of fiber is typically characterized as a fiber with a large core relative to the cladding and a less than step function refractive index change at the interface of the core and cladding (hereinafter multimode fiber). Later work in this area was directed toward creating a parabolic index profile in the multimode fiber. This was accomplished by controlling the diffusion between the core and the cladding.

In the case of making single mode fiber from a double crucible, the challenge of limiting diffusion is much greater for at least the reason that the core of a single mode fiber is much smaller than the core of a multimode fiber. Typical core size of a single mode fiber is 3–6 microns. Thus a diffusion depth of 1 micron may affect a significant portion of the core of a single mode fiber.

Prior attempts to limit diffusion in a single mode fiber have been made in the rod-in-tube method of manufacturing fiber. This method requires the use of distinct portions of core and cladding material. The distinct portions of core material are inserted into the cladding material. This assembly is then consolidated and drawn at a high viscosity. This method suffers from interfacial contamination, increased fiber attenuation, and additional thermal histories being imposed on the glass. The application of additional thermal history is especially harmful to types of glasses that are prone to devitrification.

Another challenge in drawing a single mode fiber from a multiple crucible is the core size. If the core size is too large, the fiber will not be single mode. If the core size is too small, the fiber will not support a mode of light at the required wavelength. Another issue is maintaining the consistency of the diameter of the core along the length of the fiber.

Past attempts to draw a fiber with a consistent suitably sized core have focused on the issues of the viscosity of the glass raw materials, the ratio of orifice diameter of the crucibles for the core and cladding glasses, as well as the draw speed. However, these attempts have not demonstrated the necessary sensitivity to be applicable to the requirements for the core size of a single mode fiber.

SUMMARY OF THE INVENTION

The present invention relates to a method of making an optical fiber drawn from a multiple crucible. The method includes moving a first crucible of the multiple crucible relative to a second crucible of the multiple crucible. An optical fiber is drawn from the multiple crucible and the location of the core of the fiber with respect to the cladding of the drawn fiber is documented. The aforementioned steps of moving the first crucible, drawing fiber, and documenting the location of the core of the drawn fiber are repeated until the core is located at a desired point of the drawn optical fiber. One example of a desired point of the drawn fiber is the center of the fiber.

One embodiment of the invention includes establishing a position of the core of an optical fiber drawn from the multiple crucible, preferably the position is a radial position. This can be facilitated by employing a graduated x-y plane along a cross section of the fiber, along which the location of the core of the fiber can be moved. The location of the core, of fiber drawn subsequently to the employing step, along an x-axis of the x-y plane is altered to locate the core at a center of the x-axis. The location of the core, of fiber drawn subsequently to the employing step, along a y-axis of the x-y plane is altered to locate the core at a center of the y-axis. Advantages which result from practicing the method disclosed herein include the ability to center the core of the fiber irrespective of the circumferential orientation of the core of the fiber.

A further invention described herein is a method of making fiber from a multiple crucible apparatus to minimize core and cladding diffusion. A tip of the first crucible is aligned axially above a tip of the second crucible by a preselected distance to minimize core and cladding diffusion. A fiber is drawn from the multiple crucible apparatus under non-isothermal conditions of a temperature gradient of at least about 10° C. per mm. The temperature gradient extends from at least the tip of the first crucible to the tip of the second crucible. By orienting the tips of the two crucibles appropriately with respect to one another, the diffusion between the core and cladding of a fiber drawn by a multiple crucible method is minimized, thereby enabling the drawing of fiber having a step refractive index change at the core and clad interface. Furthermore, practicing the invention enables maintaining the core/clad interface cleanliness without imposing additional thermal histories on the glass. A still further advantage which may result from practicing the above method is minimizing the potential of devitrification occurring in the drawn fiber. In turn, minimizing devitrification reduces attenuation and improves the tensile strength of the drawn fiber.

An additional method described herein includes applying a differential pressure to a body of raw materials in the first crucible. The application of the pressure effects a change in the size of the diameter of the core of the drawn fiber. One advantage of the aforementioned method includes the ability to adjust the size of the core of the fiber to a predetermined size. This advantage includes the ability to continually draw the fiber and maintain the core diameter within a predetermined range. Furthermore, practicing the above method enables the production of an optical fiber having an accurate core geometry along the length of the fiber.

All of the above methods include the advantage of being applicable to both soft and hard glasses. The above methods also have in common at least one more advantage, that the methods may be easily incorporated into existing fiber draw equipment.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
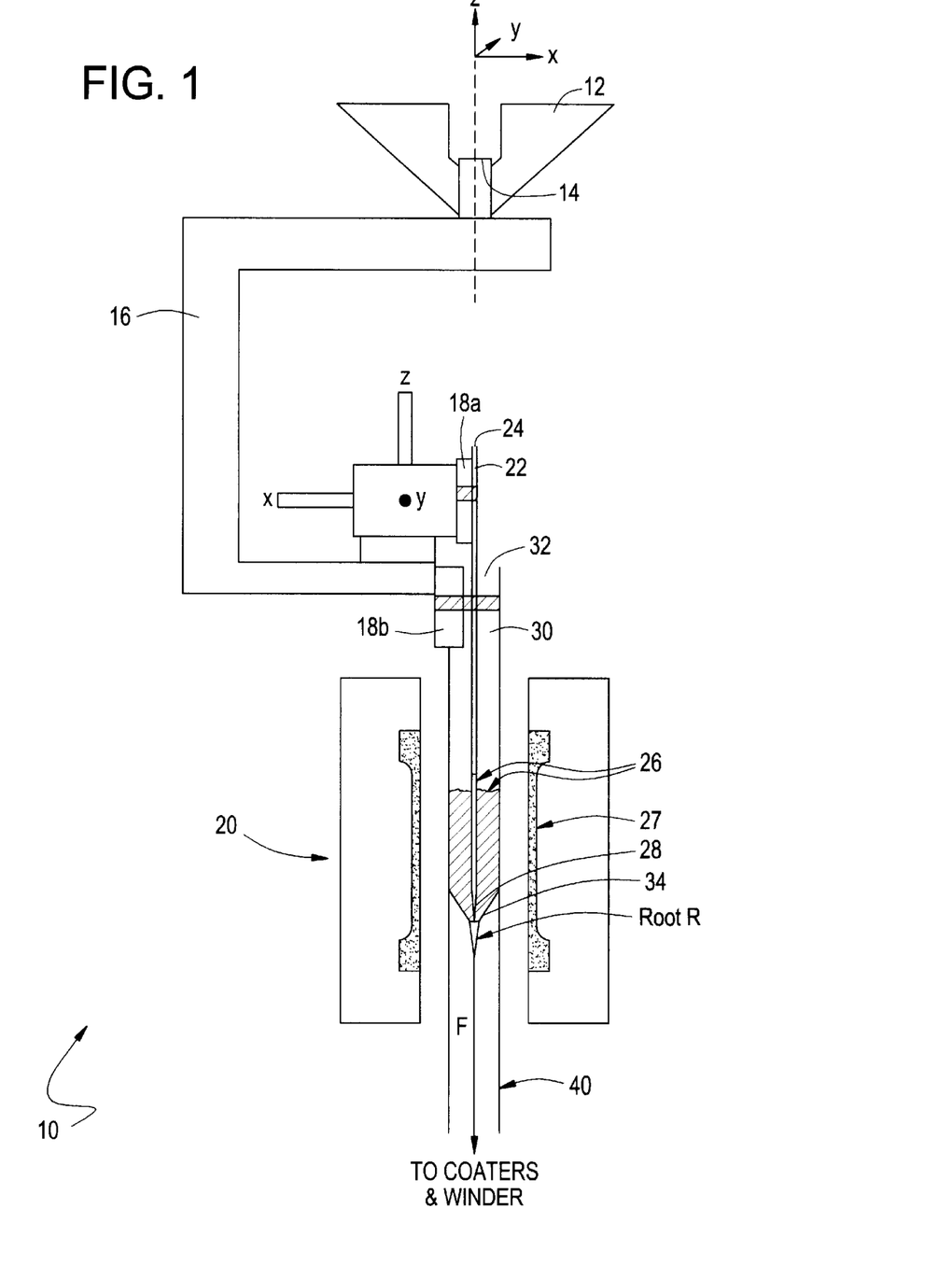
FIG. 1 is a schematic cross sectional view of an apparatus which may be used to practice the present invention.

An exemplary embodiment of a multiple crucible draw apparatus which may be used to practice the present invention is shown in FIG. 1, and is designated generally throughout by reference numeral 10. Illustrated in FIG. 1 is a multiple crucible apparatus in the form of a double crucible draw apparatus. The present invention is applicable to any and all multiple crucible draw processes. For example the invention is equally applicable to a triple crucible or a quad crucible. One factor in determining a preferable number of crucibles is the number of distinct layers of glass required in the fiber. For example, for a fiber with a simple step index core and a cladding a double crucible draw apparatus may be preferred. For a fiber with a multi-segment core and a cladding a triple crucible draw apparatus may be preferred.

The multiple crucible apparatus 10 includes a feed alignment element 12 and a support bracket 16. Bracket 16 is mounted to a stationary object by any known technique. Alignment element 12 is aligned with a first crucible 22 of apparatus 10. Core glass raw materials are fed into first crucible 22 by first passing through an aperture 14 of element 12. Aperture 14 is aligned with an opening 24 of crucible 22.

Apparatus 10 also includes a second crucible 30. Crucible 30 has an opening 32. Cladding raw materials are fed into apparatus 10 through opening 32. Crucible 22 is moveably positioned inside crucible 30.

Element 12 may be integral or separate from bracket 16. Bracket 16 includes an adjustment mechanism 18a for first crucible 22 and 18b for second crucible 30 of apparatus 10. Mechanisms 18a and 18b are connected to bracket 16. Mechanism 18 can be affixed to bracket 16 by known techniques. Each crucible 22 and 30 of apparatus 10 is movably connected to its associated respective mechanisms 18a or 18b. Mechanisms 18a can be used to move first crucible 22 in the x or y direction, preferably in the x, y, or z direction. In practicing the invention, preferably, the respective crucible is moved along one of the three axes (x, y, or z) at a time. Mechanism 18b may be used to move second crucible 30 in the same manner as mechanism 18a is used to move crucible 22. Suitable examples of mechanisms 18a and 18b are available from Newport in Irvine, Calif. One preferred mechanism 18a or 18b is the 460A-XYZ translation stage from Newport. Another possible example of mechanism 18a or 18b include a ball and screw type or other type device for automatically moving the respective crucible.

Preferably, mechanism 18a includes a controller to regulate the movement of crucible 22 along x, y, or z directions respectively. The controller may be integral or separate from mechanism 18a. One example an integral controller is the hand micrometer which is incorporated into the 460A-XYZ translation stage. In another embodiment, the movement of crucible 22, by mechanism 18a, is regulated by an electronic controller (not shown) aligned in cooperation with element 18a. An example of a preferable controller is a Newport Universal Motion Controller ESP-300, available from Newport. Preferably, the micrometer of the 460A-XYZ is removed from the mechanism and replaced with an 850G (available from Newport) actuator and the ESP-300 controller. The controller can be used to regulate the movement of crucible 22 a desired distance along a certain axis of the X, Y. or Z axes. The controller can regulate the movement of crucible 22 along one of the axes or any combination of the three axes.

Crucibles 22 and 30 may be made of any material with sufficient heat resistance for the given core and cladding raw materials. Preferable raw materials are disclosed in WO 99/51537, U.S. patent application Ser. No. 09/288,454, filed on Apr. 4, 1999, and U.S. patent application Ser. No. 09/499,010, filed Feb. 4, 2000, the specifications of which are incorporated herein by reference. Each composition of glass disclosed is a composition for a soft glass. In relative terms, a soft glass is a glass with a strain point that is equal to or less than the strain point of a soda-lime glass (approximately 420 to 470° C.). Glasses with a strain point above that of soda lime glass can be considered a hard glass. The glass compositions disclosed in the referenced applications are compositions of antimony oxide glass, a.k.a. antimony silicate glass. The glass compositions disclosed may be drawn into a core, a cladding, or any other glass layer of an optical fiber drawn from a multiple crucible apparatus. The present invention is not limited to the raw materials cited in the referenced patent applications. In a preferred embodiment, the crucible 22 should be able to withstand a temperature of at least 1500° C. Preferably the crucibles 22 and 30 are made from fused silica. Preferably, the crucibles may be constructed from any material that will not react with the glass raw materials.

Each crucible 22 and 30 has a tip 28 and 34, respectively. Tips 28 and 34 are disposed on the opposite end of crucibles 22 and 30 than the respective crucible openings 24 and 32. The preferred taper, of tips 28 and 34, is about 30 to about 45 degrees with respect to the axial centerline of the respective crucible. It is preferred that crucibles 22 and 30 have a common axial centerline.

The distance between tip 28 of crucible 22 and tip 34 of crucible 30 may vary in the axial direction z of apparatus 10. The distance is varied between tip 28 and tip 34 by a vertical adjustment element of either mechanism 18a or 18b. Optionally apparatus 10 includes muffle 40. Muffle 40 extends axially downward beyond tip 34 from crucible 30.

The apparatus 10 may also include a furnace 20. Furnace 20 is not required to practice the present invention. A suitable furnace that may be used in accordance with the invention is disclosed in U.S. patent application Ser. No. 09/477,599, filed Dec. 30, 1999, by Trentelman, the specification of which is incorporated herein by reference. However, the invention is not limited the aforementioned furnace.

One embodiment of the present invention relates to a method of making an optical fiber drawn from the apparatus 10. The method includes moving crucible 22 relative to crucible 30 of apparatus 10. An optical fiber is drawn from apparatus 10 and the location of the core of the drawn fiber is documented. The location of the core of the fiber is documented with respect to the cladding of the fiber. The above steps of moving crucible 22, drawing fiber, and documenting the locations of the core are repeated until the core is located at a desired point of the drawn fiber. Preferably the desired point is the center of the fiber. Furthermore, the invention is not limited to moving crucible 22 relative to crucible 30. The invention may also be practiced by moving crucible 30 relative to crucible 22.

Preferably, the moving of crucible 22 comprises adjusting the location of the first crucible along a first axis to determine a center of the fiber along the first axis. It is further preferred that the location of the first crucible is moved along a second axis to determine a center of the fiber along the second axis. It is more preferred that the first and second axes intersect. One example of first axis and second axis that intersect is the x-axis and the y-axis of an x-y plane. This embodiment of the invention may also include measuring the offset of the core the fiber from the desired point of the fiber. The core offset is the distance that the core is away from the desired point. It is further preferred that if the core is offset from the desired point, that the core is moved until the offset is minimized. The minimum core offset has been obtained when any further movement of crucible 22 in either direction along the particular axis produces an increase in the offset. Upon learning the core offset has decreased, the core is returned to the previous position. The previous position of the core is the minimum offset. More preferably, the core offset is minimized along both the first axis and the second axis.

In a multiple crucible apparatus, the invention is practiced by moving at least one crucible relative to a second crucible that remains stationary. For example in a triple crucible apparatus, the invention may be practiced by moving one or two of the crucibles relative to a third crucible that will remain stationary. In this embodiment, it is preferred that only one crucible is moved at a time.

In one preferred embodiment, crucible 22 is first moved along the x-axis of the x-y plane to locate a core of the fiber at the center of the x-axis. Next, crucible 22 is moved along the y-axis of the x-y plane to locate the core of the fiber at the center along the y-axis. However, the invention is not limited to locating the core of the fiber at the center of the x-axis first. The core can be located at the center of either the x-axis or y-axis of the fiber first.

One embodiment of the invention includes establishing a location of the core in the fiber. The location of the core of the fiber may be established by examining a cross section of the fiber under a microscope. The cross section of fiber is cut from a segment of fiber. A suitable clever for cutting the sample is a York FK11-PK available from PK Technology of Beaverton, Oreg. A preferred microscope is Nikon Optico-2 available from Brook-Anco Co. of Rochester, N.Y. The microscope may include a video camera and a CRT display. Once the cross section is displayed, cross-hairs may be added to the image of the cross section to provide a point of reference for establishing the core location. It is preferred that the cross-hairs may be moved to measure various core sizes. Optionally in addition to the cross-hairs, a measuring scale may be added to the displayed image. The scale can be used to measure the offset of the core from the desired point in the radial direction, as well as, the offset along both the x and y axes of the cross section of the fiber. A suitable video camera is a Boeckler Instrument VIA-170, available from Videoimage Maker Systems of Tucson, Ariz. The use of the above equipment will enable a person of ordinary skill in the art to determine the location of the core relative to the desired point and the equipment may be used to measure the offset of the core.

A graduated x-y plane along the planar cross section of the fiber is determined. Mechanism 18a or 18b allows the location of the core of subsequently drawn fiber to be changed along the x-y plane. The location of the core relative to the x-y plane can be moved. It is preferred that the location of core is changed along one axis at a time and by using mechanism 18a. For example, the location of the core of the fiber along the x-axis of the x-y plane is altered to locate the core at a center of the x-axis. Then the location of the core of the fiber along the y-axis is altered to locate the core at the center of the y-axis. The invention is not limited by which axis the core is centered along first.

Preferably, each axis is graduated in increments of no more than 250 microns, preferably no more than 150 microns. Also preferably the process of locating the core of the fiber at the center of an axis includes repeatedly adjusting a position of crucible 22 along one respective axis and documenting the location of the core of the fiber until a center position of the respective axis is determined.

Preferably, the fiber drawing process has reached a steady state before a particular cross sectional sample of the fiber is taken. By steady state, it is meant that the mass flow rate of material into apparatus 10 is substantially equal to the mass flow rate of material out of apparatus 10 and preferably the core position has stabilized. The core position is stabilized if the core is positioned within about a tenth of a micron of the core's final position associated with the shift of crucible 22. It is more preferred that the mass flow rate of material into apparatus 10 is within a range of +/−5% of the material out of apparatus 10. It is most preferred that the mass flow rate of material into apparatus 10 is within a range of +/−1% of the mass flowrate of material out of apparatus 10. For the aforementioned preferred raw materials, a typical mass flow rate of fiber (material) out of apparatus 10 is about 36 to about 48 grams per hour. This aforementioned mass flowrate equates to a draw speed of more than about 10 meters per minute.

It is also preferred that the root R of the fiber is drawn at a substantially constant viscosity. It is preferred that the viscosity of the root is at least about 10,000 poises. It is more preferred that the viscosity of the root is about 10,000 to 100,000 poises. It is most preferred that the viscosity of the root is about 20,000 to 40,000 poises. With respect to body 26, the viscosity of the raw materials are preferably more than about 20 to less than about 10,000 poises, more preferably between about 100 to about 1000 poises, and most preferably about 300 to about 500 poises.

It is further preferred that the head height of the body of raw materials 26 in at least one of the crucibles 22 or 30 is maintained substantially constant. One advantage of a substantially constant head height is the minimization of the possibility of creating lateral forces in a crucible that may cause one of the crucibles to shift. It is more preferred that the head height in crucible 30 is maintained substantially constant. It is most preferred that the head height in both crucibles 22 and 30 is maintained substantially constant. By substantially constant it is meant that the head height is maintained with a range of less than about 50% change in head height from the starting head height, a more preferred range is less than about 15%, and a most preferred range is less than about 5%. For one embodiment of the invention, maintaining the head height substantially constant equates to maintaining the head height between about 50 to about 100 millimeters in at least one of crucibles 22 and 30. In a more preferred embodiment, the head height is maintained between about 70 to about 80 millimeters. In a further preferred embodiment of the invention, the crucible height is maintained constant in both crucible 22 and 30. However, it is not necessary that the head height in crucible 22 is maintained at the same level as the head height in crucible 30, or vice versa.

To minimize diffusion between the core and cladding, the interface of the core and cladding is preferably formed in a longitudinal viscosity gradient. For at least the reason that the volume of glass present below the tip of crucible 22 is small, the fiber formed from this interface is extracted from the orifice of tip 34 and quenched into fiber relatively quickly. Besides the volume of glass, other parameters that impact diffusion are contact time and viscosity. The contact time is the amount of time that core glass raw material is in contact with cladding glass raw material between tip 28 of crucible 22 and exiting tip 34 of crucible 30 as root R. The longer the contact time and the lower the viscosity of glass raw materials, the more potential for diffusion exists.

The impact that these parameters have on diffusion can be minimized by a close proximity of the tip 28 of crucible 22 and tip 34 of crucible 30. However, if the tips are too close other problems are created, e.g. flow may be reduced and process speed is negatively impacted. It has also been discovered that core roundness can be effected if the tip area is too cold and/or the tips are too close together.

Figure 2:
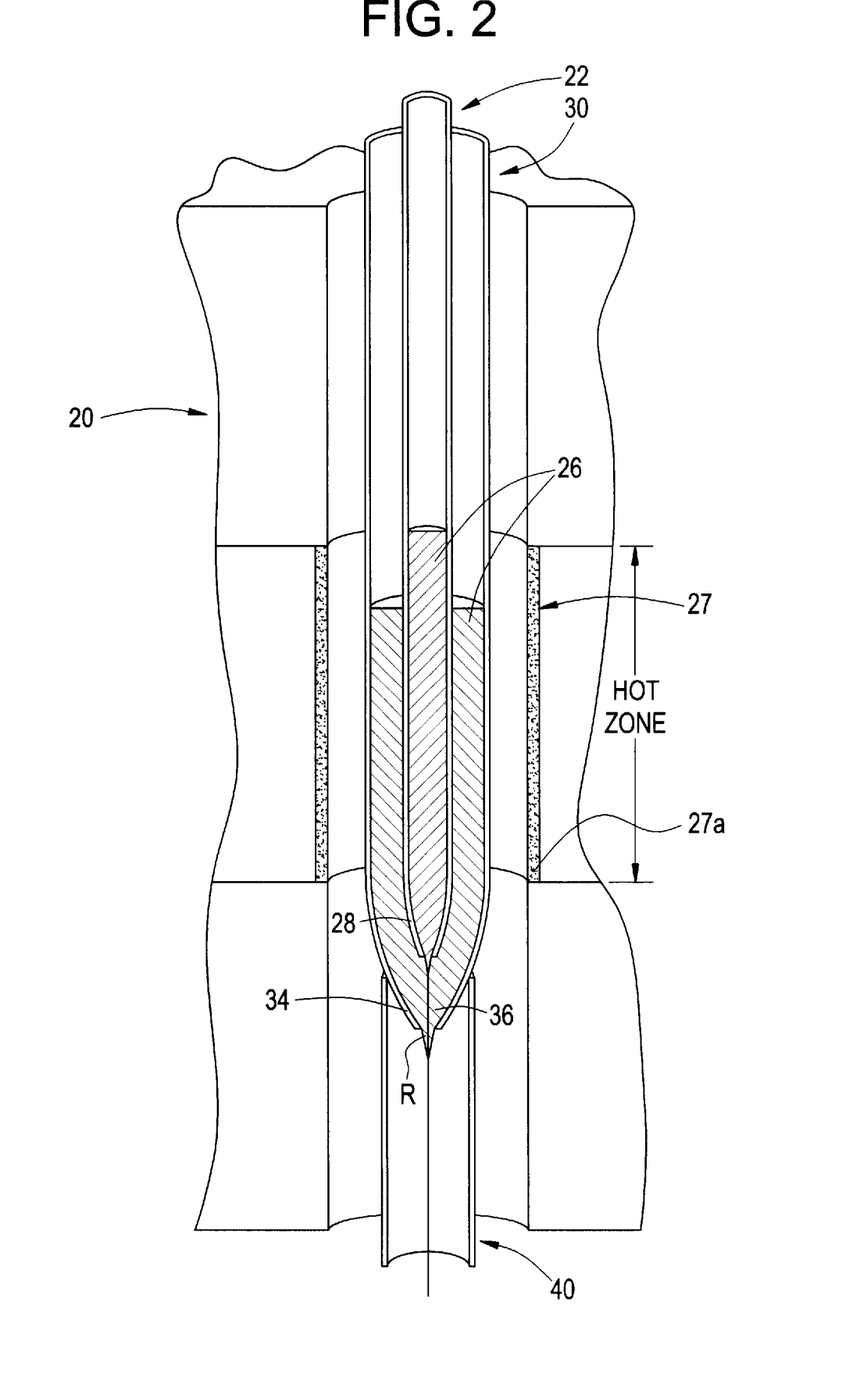
FIG. 2 is a cross sectional view of a tip of a first crucible disposed apart from a tip of a second crucible in accordance with the invention.

As illustrated in FIG. 2, the invention includes aligning tip 28 axially above tip 34. Preferably tip 28 is disposed at least about 2 to about 19 millimeters axially above tip 34. More preferably, tip 28 is disposed about 2 to about 10 mm above tip 34. Even more preferably, tip 28 is disposed about 2 to about 5 mm above tip 34.

In disposing tip 28 above tip 34 by the above amount, the contact time is minimized to reduce the amount of time the core glass raw materials and cladding glass raw materials have to diffuse and likewise the diffusion between the core glass raw materials and the cladding glass raw materials is minimized. The contact time may range from about a few seconds to about 1 minute. It is preferred that the contact time is no more than about 45 seconds, it is more preferred that the contact time is no more than about 30 seconds, it is most preferred that the contact time is no more than about 20 seconds.

Preferably, the impact that viscosity has on increasing diffusion is minimized by drawing the fiber from the apparatus 10 under non-isothermal conditions. Preferably, the fiber is drawn from apparatus 10 at a temperature gradient of at least about 10° C. per mm from at least tip 28 of crucible 22 to tip 34 of crucible 30. A more preferable temperature gradient is a change in temperature of at least about 25° C. per mm, most preferably the change is at least about 50° C. per mm. It is preferred that the above temperature gradient is a longitudinal temperature gradient and not a radial temperature gradient. Preferably, drawing the fiber under non-isothermal conditions creates the longitudinal viscosity gradient as the raw materials proceed from tip 28 to root R.

In another embodiment, the temperature gradient is initiated when the raw materials exit from the hot zone of a furnace as shown in FIG. 2. The temperature gradient can begin at the end of heating element 27 closest to tip 28 by aligning a portion of each body of raw materials 26 to extend longitudinally beyond end 27a of heating element 27 As shown in FIG. 2, the hot zone of furnace 20 is described as the longitudinal section of furnace 20 that includes heating element 27.

A person of ordinary skill will realize that depending on the type of heating element implemented into furnace 20, the exact location for the hot zone may vary. As described in U.S. patent application Ser. No. 09/477,599, the hot zone is disposed along an entire length of the furnace between first and second thin sections (not shown) of the heating element. The hot zone is formed by the heat generated at each thin section and the radiant exchange of the heat along the length of the furnace between the thin sections. A reason for the heat being generated primarily at each thin section is that the resistance at each thin section is greater than the resistance at the thick section. The temperature of the hot zone of furnace 20 can be measured by a thermal couple immersed along a longitudinal centerline axis of furnace 20. The thermocouple can measure the ambient temperature along the axis along the entire length of heating element 27. One advantage of measuring along axis A is that this a good indicator of the amount of heat that would be transmitted toward a body of raw materials disposed inside furnace 20. A person of ordinary skill in the art will realize that the actual temperature in the body of materials may be different than the ambient measurements for at least the reason of the different thermal properties of ambient air and the fiber raw materials. The temperature inside furnace 20 may also be measured by a pyrometer extending through a portal (not shown) in furnace 20 into the area between heating elements 27.

In measuring the diffusion between the core and the cladding of the drawn optical fiber, it is preferred that no more than about 5% of the cladding glass has diffused into the core region, more preferably no more than about 4%, and most preferably about 3%. It is also preferred that the center of the core of the drawn fiber does not contain any cladding glass.

If a cross section of the fiber is measured by microprobe analysis (see example 2), the diffusion can also be measured in terms of delta ($\Delta$). The delta for a particular element is calculated in accordance with the below formula:

$$\Delta = (\text{Avg. Core} - \text{Avg. Clad}) / \text{Avg. Clad}.$$

Avg. Core means the average number of counts/ sec. sampled for the core region of the fiber for a particular element. Avg. Clad means the average number of counts/sec. sampled for the cladding region of the fiber. In the case of the aforementioned preferred raw materials, the preferred delta for silicon is less than about −0.050, more preferably less than about −0.060, most preferably less than about −0.069. For antimony, the preferred delta is more than about 0.031, more preferably more than about 0.036, and most preferably more than about 0.041. Delta may also be expressed in terms of present by multiplying each number by 100.

In one embodiment of the invention, it is preferred that tip 34 has an exit orifice 36 with a diameter of no more than about 1.0 millimeter. It is more preferred that orifice 36 has a diameter of no more than about 0.7 millimeters. It is most preferred that orifice 36 has a diameter of about 0.6 millimeters.

Preferably the aforementioned methods are practiced by maintaining body 26 at or above a viscosity at which body 26 is in a liquid state (hereinafter liquid viscosity). It is further preferred that both the cladding glass and the core glass raw materials are maintained at or above their respective liquid viscosity. For the aforementioned raw materials, optionally, the body 26 is at a viscosity of less than about 10,000 poises, preferably more than about 20 poises to less than about 10,000 poises, more preferably, from about 100 poises to about 1,000 poises, and most preferably about 300 to about 500 poises. A suitable temperature at which the viscosity of body 26 is less than about 10,000 poises is about 1500° C. or less, preferably about 1200 to about 1450° C., and more preferably about 1250 to about 1300° C.

With respect to root R, a preferred viscosity of root R is about at least 10,000 poises, more preferably about 10,000 to about 100,000 poises, most preferably about 20,000 to about 40,000 poises. A temperature at which root R has a viscosity of at least at about 10,000 poises is no more than about 1150° C., preferably about 800 to about 1150° C., more preferably about 900° C. to about 1100° C. In comparing the temperature of root R to the temperature of body 26, it is preferred that root R is at least about 100° C. cooler than the temperature of body 26, more preferably root R is at least about 200° C. cooler, and most preferably at least about 300° C. cooler.

Preferably root R is quenched with a cooling medium for approximately about 40 to about 60 seconds as root R exits tip 34. A suitable cooling medium is ambient air. However, the invention is not limited to only the aforementioned cooling medium.

An additional embodiment includes the ability to effect a change in the size of the diameter of the core of the drawn fiber. The size of the diameter of the core may be altered by applying a differential pressure to a body of raw materials in crucible 22. The differential pressure may be a positive pressure or a negative pressure. In the case. of a negative pressure the negative differential pressure may also be referred to as vacuum.

In the case that crucible 22 is the crucible that includes a body of raw materials 26 to form the core of the fiber, the application of a positive differential pressure will increase the core size. In contrast, the application of a negative differential pressure or vacuum will decrease the core size. This embodiment is not limited to applying a differential pressure to only the crucible which includes the core glass raw materials. Accordingly, the differential pressure may be applied to one or more crucibles which corresponds to the formation of an outer layer of the fiber, e.g. a cladding layer. It is preferred that the differential pressure is only applied to one crucible of the multiple crucible at a time.

In practicing this embodiment, a first end of a hose is connected to opening 24 of crucible 22. A second end of the hose is attached to a source for providing positive or negative pressure upon the body of raw materials contained in crucible 22. It is preferred that the fiber draw process has reached a steady state and the size of the core diameter is determined. If the size of the core diameter is outside a predetermined range, the desired positive or negative pressure is applied. The process of checking the size of the core diameter and applying the desired pressure is repeated until the core diameter is within the desired range. The size of the diameter of the core of the fiber can be determined from the cross section sampled.

In one embodiment of the invention, it is preferred that the pressure applied has an absolute value up to about 1.0 pounds per square inch, it is more preferred that the absolute value of the pressure is up to about 0.5 pounds per square inch. It is most preferred that the absolute value is up to about 0.2 pounds per square inch.

Optionally the pressure applied may remain substantially constant during the drawing process. Preferably the pressure applied is maintained within a range of about +/−0.01 pounds per square inch, more preferably within a range of about +/−0.005 pounds per square inch, and most preferably within a range of about +/−0.001 pounds per square inch.

In the case of drawing a single mode fiber it is preferred that the core of the fiber has a diameter that is no more than about 7 microns. It is more preferred that the core diameter of the fiber is about 3 to about 6 microns. It is most preferred that the core diameter of the fiber is about 4.5 to about 5.5 microns.

It is also preferred that the diameter of the core of fiber remains substantially constant along the length of the fiber. It is more preferred that the diameter of the fiber is maintained within a range of about +/−0.5 microns along the length of the fiber. It is most preferred that the diameter of the core of the fiber is maintained within a range of about +/−0.1 microns along the length of the fiber.

The above methods are preferably practiced when apparatus 10 is operating as a continuous process and once the process has reached a steady state at a constant thermal gradient. The methods may be used to center the core of the fiber to an accuracy of about 1 micron or less.

Single mode fiber can be drawn in accordance with the methods disclosed herein. It is preferred that the single mode fiber exhibits a step index between the core and the cladding. A step index fiber has a refractive index profile characterized by a uniform refractive index within the core and a sharp decrease in refractive index profile at the core-cladding interface. These single mode fibers can be fibers doped with at least one of the following: a refractive index increasing dopant; refractive index decreasing dopant; a rare earth dopant; or combinations thereof. Fiber drawn in accordance with the invention has an excellent application as fiber gain modules for optical amplifiers. The invention may be practiced to manufacture the fiber described in U.S. Patent application serial No. 60/188,492 filed Mar. 10, 2000, entitled Optical Fiber with Absorbing Overclad Glass Layer. The specification of which is incorporated herein by reference.

EXAMPLES

The invention will be further clarified by the following examples which are intended to be exemplary of the invention.

Example 1

Centering the Core

In the example, multiple crucible 10 was used to draw a fiber with a core that was located in the center of the fiber.

When the test fiber was drawn, apparatus 10 was operating at a steady state, the rate at which cutlet was added to crucibles 22 and 30 was about the same as the rate fiber was drawn from crucible 10. The apparatus was acting as a continuous process and the temperature profiles in crucibles 22 and 30 were maintained constant. Also the head heights in crucibles 22 and 30 remained substantially constant, such that the addition of new cullet to body 26 did not create lateral forces to shift crucible 22.

Once the apparatus was operating at a steady state, the location of the core was established by determining the radial separation of the core and the fiber center (a.k.a. core/fiber center offset). A cross sectional sample of the fiber was analyzed with the aforementioned microscope. An axis was chosen along either the x or y direction of the cross section of the fiber, in the example the y-axis was chosen first. The axis was indexed by about 150 microns, experience has proven that 150 microns is a suitable index amount. The position of crucible 22 was shifted along the chosen axis in increments of 150 microns.

Once position of crucible 22 was shifted, the apparatus was operated for a suitable period of time to allow for the process to reach a steady state for the shift in position of crucible 22 (typically 2–5 minutes). The fiber was then sampled and a new core/fiber center offset was measured. The offset is either better or worse. If it is worse a similar move of 150 microns in the opposite direction is made in a effort to return the crucible to the first previous position. The process is then repeated to measure the new offset and once the new offset is determined, crucible 22 is moved in the appropriate direction again.

If the offset is better, the shift is continued in the same direction along the axis. Crucible 22 is moved in the same increment, essentially mapping out the response of the offset to moves of crucible 22 in the chosen direction. The offset, when plotted out will show a minimum. This minimum represents the optimum setting for the chosen axis. Crucible 22 was then fixed along the chosen axis at the minimum. Once the minimum for one axis was determined, the process was repeated with respect to the second axis. The combined minimum for the two axes represented the zero offset condition and the core was centered.

Figure 3:
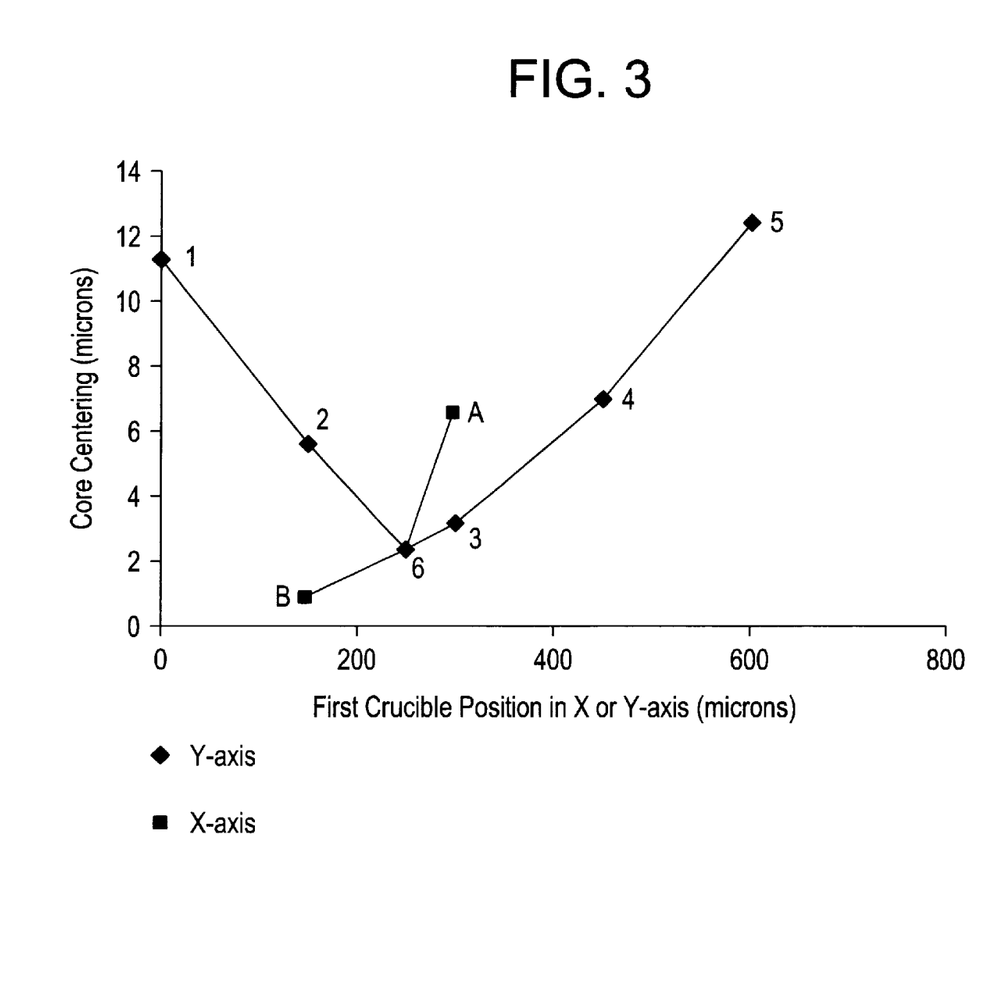
FIG. 3 is a sample of a graph that may be generated by practicing a method of the present invention.

FIG. 3 illustrates the results of practicing the aforementioned steps. The index moves in x and y directions were 150 microns which produced the measured offsets of points 1–5 in the y-axis. Point 6 in the y direction was established after points 1–5 were measured, since it appeared to be a possible minimum of the y-axis. Then the x-axis moves were initiated, again at 150 micron intervals, points A and B. Two moves were required to achieve a measured offset of less than one micron.

Figure 4:
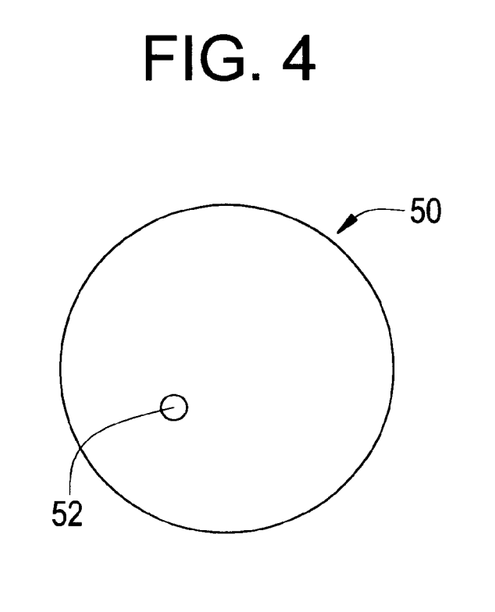
FIG. 4 is a cross sectional view of a drawn optical fiber before the core of the fiber has been located at the preselected point.
Figure 5:
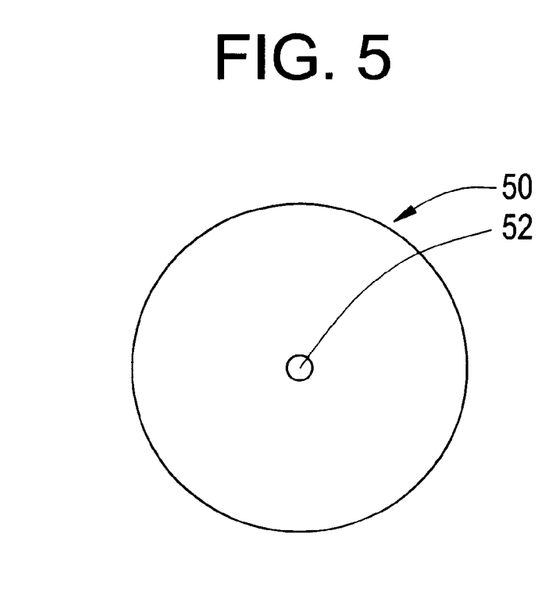
FIG. 5 is a cross sectional view of a drawn optical fiber in which the core of the fiber has been located at the preselected point in accordance with one embodiment of the invention.

FIGS. 4 and 5 illustrate the position of the core within the fiber both before (FIG. 4) and after (FIG. 5) the core alignment procedure. In FIG. 4, a core 52 of drawn fiber 50 is offset from the center of fiber 50. Core 52 is centered by practicing the above steps as illustrated in FIG. 3. As a result of practicing the above steps, core 52 is centered in fiber 50 as illustrated in FIG. 5.

Example 2

Minimize Core Cladding Diffusion

In example 2, fiber was drawn with a core that was centered in accordance with example 1. A test fiber was drawn under steady state at non-isothermal (at least 10° C. per mm change from tip 28 to tip 34) conditions, the body of raw materials was maintained at a temperature of about 1400° C. and the root was at a temperature of about 1100° C. and tip 28 was disposed about 5 to 10 mm above tip 34. The contact time was less than about one minute. The fiber was drawn at a rate of more than about 10 m/min. The compositions of the glasses used in test are shown in table 1.

TABLE 1

| Compound | Core Glass Composition (weight %) | Clad Glass Composition (weight %) |
| --- | --- | --- |
| $SiO_2$ | 73.0 | 77.0 |
| $Al_2F_6$ | 2.0 | 2.0 |
| $Al_2O_3$ | 0.5 | — |
| $Er_2O_3$ | 0.1 | — |
| $Sb_2O_3$ | 24.4 | 21.0 |

A control fiber was drawn under isothermal conditions at 1275° C. The contact time was about 10 minutes. The composition of the glasses of the control fiber was the same as that of the test fiber. During the drawing of the control, fiber tip 28 was disposed about 20 to 40 mm above tip 34. The control fiber was drawn at a rate of about 15 m/min. The draw rate of the control fiber was adjusted to draw fiber with an outside diameter of about 125 microns. The control fiber had the same composition as the test fiber.

Samples of the test fiber and the control fiber were examined under a microprobe. The particular microprobe used was a 8900 Superprobe by JEOL USA, Inc. of Peabody, Mass. A high energy electron beam was emitted from the microprobe and focused onto a spot size of about 1 to about 1.5 microns of a cross section of fiber. It is preferred that the high energy beam is about 5 to about 15 keV (kiloelectron-Volts). Each element in the sample subjected to the high energy beam will emit X-rays of a particular wavelength characteristic of the respective element being sampled. The intensity of the wavelength is measured, in terms of counts/sec., to determine the concentration of the particular element. It should be noted that the spatial resolution of the microprobe is limited by the spot size. This limits the ability of the microprobe to measure the concentration of a particular element at the core/cladding interface. The microprobe uses these X-ray emissions and determines the identity and concentration of an element based on the detected X-rays.

The samples of fiber measured under the microprobe were about 30 microns across in linear extent. The concentration of an element of interest was measured at every tenth of a micron across the 30 microns. Each sample was divided up into three sections, the first section extended from about 0 microns to about 13 microns and consisted of a cladding region of the fiber, the second section extended from 14.5 microns to about 18.5 microns and consisted of the core region of the fiber, and the third section extended from about 20 microns to about 30 microns and consisted of a cladding region of the fiber.

Figure 6:
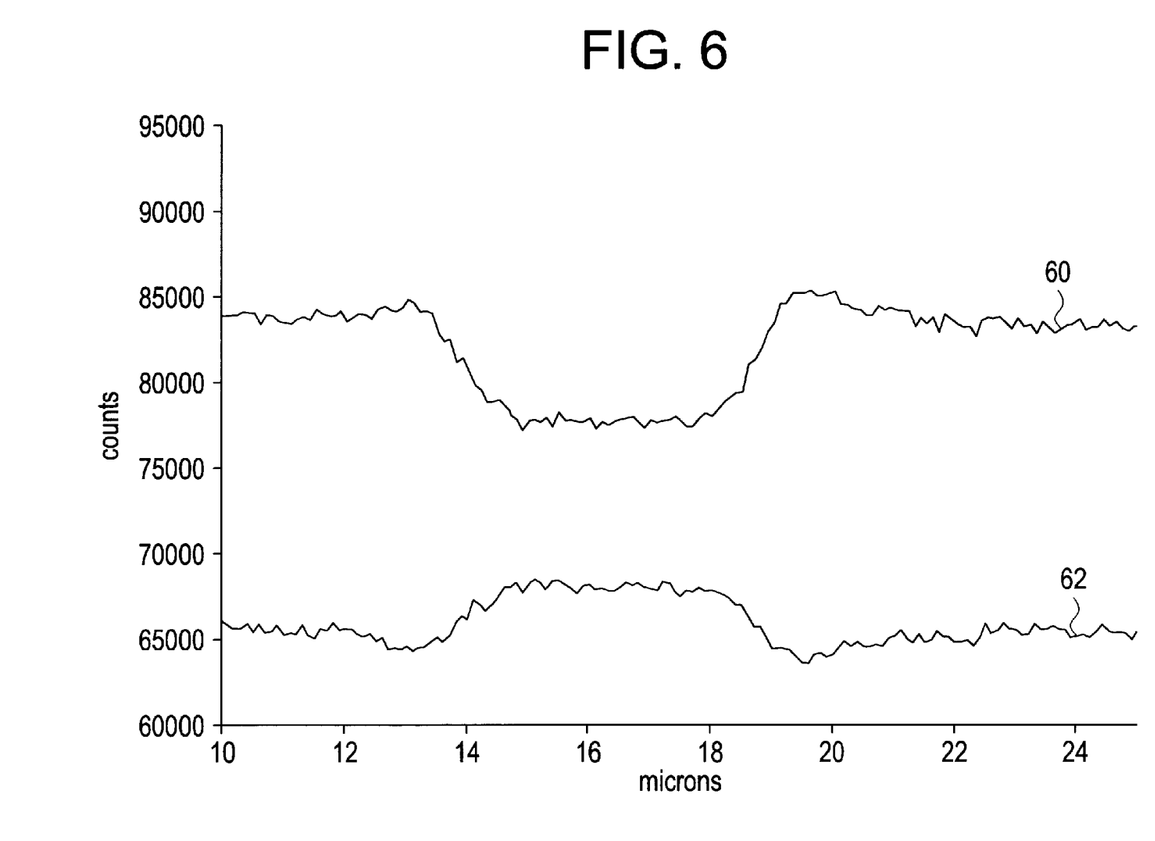
FIG. 6 is a partial view of a graph of experimental results of the concentration of antimony and silica (in terms of counts/sec.) along a cross section of a fiber, made in accordance with the invention, the cross section included the core of the fiber.
Figure 7:
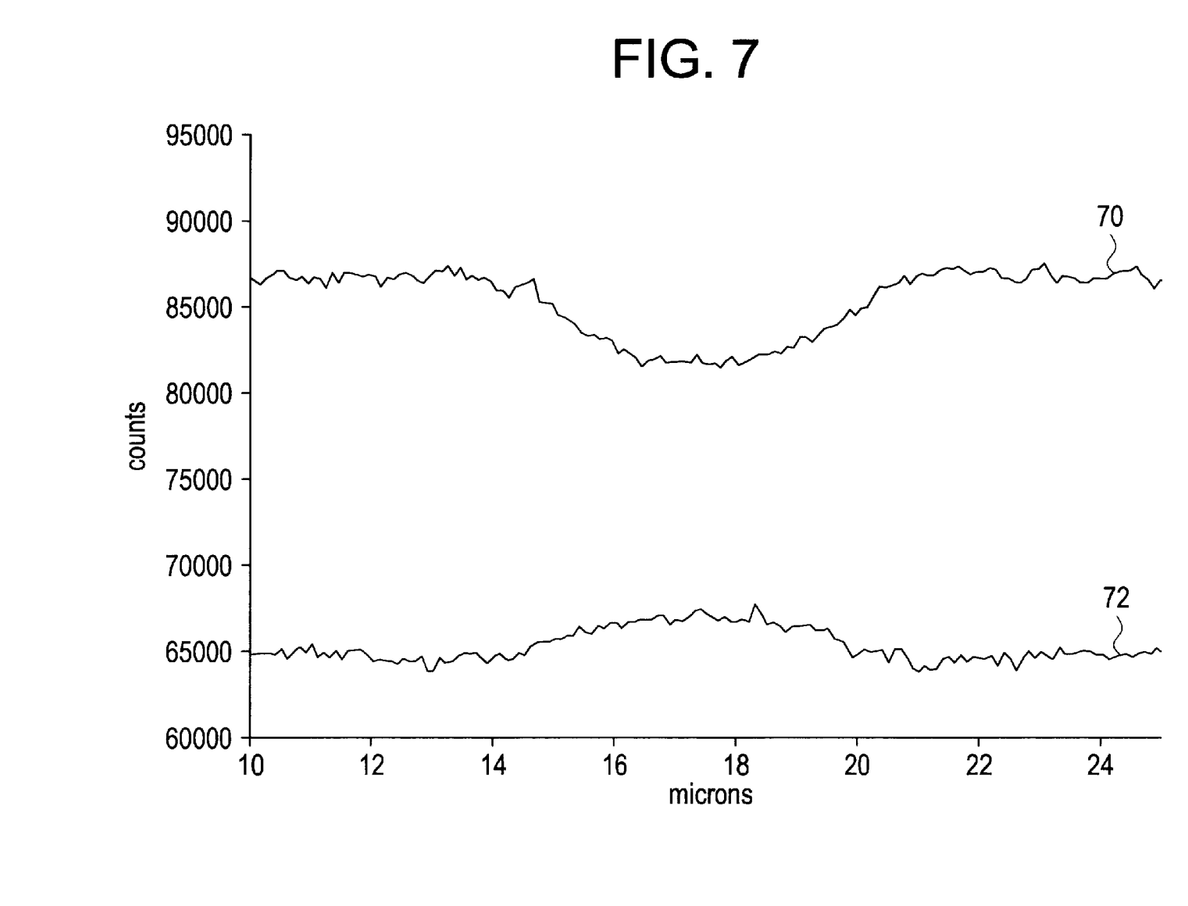
FIG. 7 is a partial view of a graph of results the concentration of antimony and silica (in terms of counts/sec.) of a control fiber along a cross section of the fiber which included the core of the fiber.

In FIGS. 6 and 7 a cross section of the test fiber and the control fiber was analyzed using the aforementioned microprobe. The portion of the cross section of the fiber shown is about 15 microns long and included the core of the fiber. The core of the fiber was located between about 13 microns to about 20 microns along the x-axis of FIGS. 6 and 7. Shown in FIG. 6 are lines 60 and 62, line 60 represents the presence of silicon and line 62 represents the presence of antimony. With respect to the test fiber, only nominal amounts of cladding material have diffused in to the core. This is represented by the concentration of silicon decreasing across the core region of the fiber (represented by a change in the count from about 85000 too less than about 80000). Likewise in the same region, the concentration of antimony increases (from about 65000 counts to about 6800 counts). A person skilled in the art will also recognize the shape of line 60 indicates a step refractive index change between the core and the cladding. A person of ordinary skill in the art will realize that the ability of the microprobe to measure the concentration of any element at the core cladding interface is limited by the sample size of the microprobe. The above microprobe has a sample size of about 1 to about 1.5 microns.

In FIG. 7, line 70 represents the presence of silicon and line 72 represents the presence of antimony. The number of counts for silicon in the core region of the fiber did not vary greatly from the number of counts for silicon in the non-core region of the fiber in comparison to the test fiber. This indicates that the core of the control fiber contains more silicon than does the core of the test fiber. The additional silicon in the core of the control fiber can be attributed to core and cladding diffusion. The same is true for the number of counts for antimony in the core region and the non-core region of the control fiber in comparison to the test fiber.

Also lines 70 and 72 indicate that core cladding interface of the control fiber is not a step function. The rounded appearance of curves 70 and 72, at the core-cladding interface, indicates that the control fiber has a less than step function change in refractive index at the interface. Thus the method disclosed herein can be practiced to produce a fiber with minimal core and cladding diffusion and a step index refractive index profile.

The avg. clad of silicon for the test fiber was about 83800 and the avg. core for silicon for the test fiber was about 78000. The avg. clad of antimony for the test fiber was about 65300 and the avg. core for antimony for the test fiber was about 68000. The avg. clad of silicon for the control fiber was about 87000 and the avg. core for silicon for the test fiber was about 83000. The avg. clad of antimony for the control fiber was about 64600 and the avg. core for antimony for the control fiber was about 66500.

The delta values for antimony and silicon were determined for both the test fiber and the control fiber. The test fiber exhibited a silicon delta of about −0.069 and an antimony delta of about 0.041. The control fiber exhibited a silicon delta of about −0.047 and an antimony delta of about 0.030.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of drawing an optical fiber from a multiple crucible, the multiple crucible having at least a first crucible with a tip and a second crucible with a tip disposed below the first crucible, said method comprising:

aligning the tip of the first crucible above the tip of the second crucible by a preselected axial distance to minimize core and cladding diffusion; and drawing an optical fiber from the crucible under non-isothermal conditions of a temperature gradient of at least about 10° C. per mm from at least the tip of the first crucible to the tip of the second crucible.

2. The method of claim 1 wherein the temperature gradient comprises at least about 25° C. per mm.

3. The method of claim 1 wherein the preselected distance is at least about 2 mm.

4. The method of claim 1 wherein the preselected distance is no more than about 19 mm.

5. The method of claim 5 further comprising forming a body of raw materials of core glass in the first crucible and a body of raw materials of cladding glass in the second crucible and heating both bodies of raw materials such that the each body has a viscosity of less than about 10,000 poises, and wherein the drawn fiber has a root with a viscosity of at least about 10,000 poises.

6. The method of claim 5 wherein the viscosity of the root comprises about 20,000 to about 40,000 poises.

7. The method of claim 5 wherein the heating step comprises heating both the bodies to a temperature at which the viscosity of each of the bodies comprises less than about 1,000 poises.

8. The method of claim 5 wherein a core of the optical fiber comprises no more than about 5% of cladding glass.

9. The method of claim 8 wherein the core comprises silica and a silica delta value for the core comprises less than about −0.050.

10. The method of claim 8 wherein in the core comprises antimony and an antimony delta value for the core comprises more than about 0.031.

11. The method of claim 1 wherein at least one of the crucibles of the multiple crucible contains a body of raw materials which comprises antimony and silica.

12. The method of claim 11 wherein a composition of the body comprises antimony-silicate.

13. An optical fiber made in accordance with claim 12 wherein at least one of the group consisting of a core, a cladding, and combinations thereof comprises an antimony silicate glass.

14. The method of claim 1 further comprising applying a differential pressure to a body of raw materials in the first crucible of the multiple crucible during drawing, thereby effecting a change in diameter size of a core of an optical fiber drawn from the multiple crucible.

15. The method of claim 14 wherein the differential pressure comprises a positive pressure thereby the change in diameter size comprises an increase in the diameter size.

16. The method of claim 14 wherein the differential pressure comprises a negative pressure thereby the change in diameter size comprises a decrease in the diameter size.

17. A method of making an optical fiber drawn from a multiple crucible, said method comprising: drawing an optical fiber from a multiple crucible apparatus under non-isothermal conditions of a temperature gradient of at least about 10° C. per mm from at least a tip of a first crucible of the multiple crucible to a tip of a second crucible of the multiple crucible.

18. The method according to claim 17 further comprising heating a body of raw materials in the first crucible to a temperature at which the viscosity of the body comprises less than about 10,000 poises and wherein said drawing comprises forming a root having a viscosity of at least about 10,000 poise extending from the tip of the second crucible.

19. The method according to claim 18 wherein the viscosity of the body of raw materials comprises no more than about 1,000 poises and the viscosity of the root comprises at least about 20,000 poise.

20. The method according to claim 17 further comprising minimizing a contact time to less than about one minute between core glass raw materials and cladding glass raw materials.

* * * * *

UNITED STATES PATENT AND TRADEMARK OFFICE
CERTIFICATE OF CORRECTION

PATENT NO. : 6,550,279 B1
APPLICATION NO. : 09/654549
DATED : April 22, 2003
INVENTOR(S) : Anderson et al.

It is certified that error appears in the above-identified patent and that said Letters Patent is hereby corrected as shown below:

Column 14,
Line 3, Claim 5 is listed as being dependent on Claim 5. Claim 5 should be corrected to be dependent on Claim 1.

Signed and Sealed this

Twenty-seventh Day of June, 2006

JON W. DUDAS
*Director of the United States Patent and Trademark Office*